United States Patent [19]
Kolomeitsev

[11] Patent Number: 5,783,940
[45] Date of Patent: Jul. 21, 1998

[54] ENCODER CIRCUIT FOR DETERMINING THE POSITION OF A ROTOR OF A MULTIPHASE MOTOR

[75] Inventor: Sergei Kolomeitsev, Saline, Mich.

[73] Assignee: Dana Corporation, Toledo, Ohio

[21] Appl. No.: 774,292

[22] Filed: Dec. 23, 1996

[51] Int. Cl.[6] .......................... G01B 7/30; H02K 11/00; H02P 7/05
[52] U.S. Cl. ........................ 324/207.25; 310/68 B; 318/701; 324/207.16
[58] Field of Search .................. 324/207.11, 207.15, 324/207.16, 207.25; 318/254, 439, 701; 310/68 B, 168

[56] References Cited

U.S. PATENT DOCUMENTS

| | | |
|---|---|---|
| 4,528,549 | 7/1985 | Simpson . |
| 4,567,465 | 1/1986 | Komiya . |
| 4,710,748 | 12/1987 | Champavier . |
| 4,827,259 | 5/1989 | Murphy et al. . |
| 5,084,704 | 1/1992 | Parrish . |
| 5,214,431 | 5/1993 | Oikawa . |
| 5,245,343 | 9/1993 | Greenwood et al. . |
| 5,448,149 | 9/1995 | Ehsani et al. ............ 318/701 |
| 5,489,845 | 2/1996 | Weber et al. . |
| 5,497,064 | 3/1996 | Van Sistine ............ 318/701 |
| 5,543,700 | 8/1996 | Sakano et al. ............ 318/701 |
| 5,642,044 | 6/1997 | Weber ............ 324/207.25 |
| 5,646,491 | 7/1997 | Erdman et al. ............ 318/439 X |

FOREIGN PATENT DOCUMENTS 0573198 12/1993 European Pat. Off. .......... 324/207.25

OTHER PUBLICATIONS

A Sliding Mode Observer Based Controller for Switched Reluctance Motor Drives, IEEE 1994 pp. 635–643.

New Modulation Encoding Techniques for Indirect Rotor Position Sensing in Switched Reluctance Motors, IEEE Transactions on Industry Applications, vol. 30, No. 1, Jan./Feb. 1994, pp. 85–91.

Rotor Position Sensing in Switched Reluctance Motor Drives by Measuring Mutually Induced Voltages, IEEE Transactions on Industry Application, vol. 30, No. 3, May/Jun. 1994, pp. 665–672.

Elimination of Discrete Position Sensor and Current Sensor in Switched Reluctance Motor Drives, IEEE Transactions on Industry Applications, vol. 28, No. 1, Jan./Feb. 1992, pp. 128–135.

Dual–Decay Converter for Switched Reluctance Motor Drives in Low–Voltage Applications, IEEE Transactions on Power Electronics, vol. 8, No. 2, Apr. 1993, pp. 224–230.

*Primary Examiner*—Gerard R. Strecker
*Attorney, Agent, or Firm*—Dykema Gossett PLLC

[57] ABSTRACT

An encoder circuit particularly suited for a switched reluctance (SR) electric motor includes a single switch and a plurality of encoder windings. Each one of the plurality of encoder windings is connected to the switch. When closed, the switch initiates current flow through the windings. A plurality of comparators are connected to the encoder windings. Each comparator has an output having a first state and second state. The output changes state when the encoder winding current exceeds a reference current level. A counter connected to the comparator outputs measures the time that each winding current is below the reference current level (i.e., before changing state). The switch simultaneously disconnects the encoder windings from a power supply after each one of the plurality of encoder windings reaches the reference current (i.e. after each of the comparators changes state). A microprocessor connected to the counter outputs determines an angular rotor position using the time that each winding current is below the reference current.

16 Claims, 3 Drawing Sheets

ENCODER CIRCUIT FOR DETERMINING THE POSITION OF A ROTOR OF A MULTIPHASE MOTOR

BACKGROUND OF THE INVENTION

1. Technical Field

The present invention relates generally to an encoder system for a multiphase motor, and, more particularly, to an encoder circuit for a multiphase variable reluctance motor.

2. Discussion of the Related Art

A conventional method for rotor position sensing uses discrete encoder coils. Typically, one pair of encoder coils per phase winding is provided. The encoder coils are disposed within the motor structure adjacent to the phase windings. The encoder coils emulate the inductance profile of the phase windings, but, use a much lower current. One end of each encoder coil is connected to a power supply, and the other end of each encoder coil is connected to the remainder of the circuitry through a respective plurality of separate switches. That is, one switch, in this conventional approach, is provided per encoder coil. It should be noted that the current in each encoder coil corresponds to the inductance value of the coil by well known electrical relationships. In turn, the inductance is related to the rotor position, as discussed above. Therefore, measurement of the encoder coil current provides information wherefrom the rotor position may be determined.

In this known approach, each of the switches is opened individually as the current in the corresponding encoder coil reaches a predetermined value (indicative that a certain rotor position has been reached). One drawback to such method is that the switches are opened independently. Specifically, the inductance level in each encoder coil is different, due to the configuration. Since all the switches will switch open at the same current level, the switching of all the switches does not occur at the same time but rather individually. In particular, when a first one of the switches is opened, the current in the corresponding encoder coil, which is energy, must be dissipated. Consequently, when the first switch opens, the magnetic flux, due to the existing current from the first encoder winding, is coupled to the remaining energized encoder coils. So coupled, an increased current level in each of the energized coils is observed. Likewise, once the second switch opens, the energy there is dissipated through the remaining energized encoder coils, and so on. The increased current level observed when a switch is opened causes an inductance error in the remaining encoder coils. The inductance error is caused due to the remaining encoder coils reaching their switching points sooner than would be expected had the encoder coil current reflected the actual position of the motor rotor. As a result, the sought-for emulation fails, and the inductance determination becomes inaccurate.

As mentioned above, timing of the commutation event of the individual phase windings is critical to develop maximum torque in the motor. The above referred-to premature switching of the encoder coils therefore provides incorrect information to the motor control system, resulting in inefficient operation.

It would therefore be desirable to provide an encoder circuit that alleviates inductance error and provides accurate information to the controlling circuitry as to the position of the rotor.

SUMMARY OF THE INVENTION

One advantage of the present invention is that since a single switch controls the respective currents in all of the encoder windings, all the windings may be switched simultaneously to thereby minimize or prevent inductance timing errors.

A preferred embodiment of the present invention includes a plurality of encoder windings, and a single switch that is connected between a source of electrical power and the encoder windings. The switch is controlled to simultaneously disconnect the encoder windings from a power source after all of the encoder windings have reached a predetermined current level (i.e., a reference current level). The switch is also controlled to simultaneously connect the encoder windings to the power source when the current in the encoder windings has subsequently dissipated. A comparator and timer are used to measure a respective time interval between the closing of the switch, and when each of the encoder windings have reached the predetermined current level. A microprocessor is also provided for determining the angular position of the motor rotor using the respective time intervals.

In another aspect of this invention, a method for detecting an angular position of a rotor of a motor is provided and includes several basic steps. The first step involves providing an encoder winding for each phase of the motor. The next step involves closing a switch to simultaneously connect each one of the encoder windings to a source of electrical power. Next, sensing a respective current level in each one of the encoder windings. The next step includes opening the switch to simultaneously disconnect each one of the encoder windings from the source when each one of the respective current levels reach a reference current level. Next, measuring a respective time interval for each of the respective current levels through the encoder windings to reach the reference current level. Finally, the last step involves generating the angular position of the rotor based on the respective time intervals measured in the previous step.

One advantage of the present invention is that timing errors associated with individually controlling the operation of each switch are eliminated. The present invention also simplifies conventional circuitry by eliminating several components, particularly several switches. The accuracy of conventional encoder circuits is improved since no current from other discharging encoder windings is coupled into another encoder winding. Each encoder current accurately represents the current through the corresponding encoder windings.

BRIEF DESCRIPTION OF THE DRAWINGS

Other objects and advantages of the prevent invention will become apparent from the following detailed description which should be read in conjunction with the drawings in which.

DETAILED DESCRIPTION OF THE PREFERRED EMBODIMENT

Figure 1:
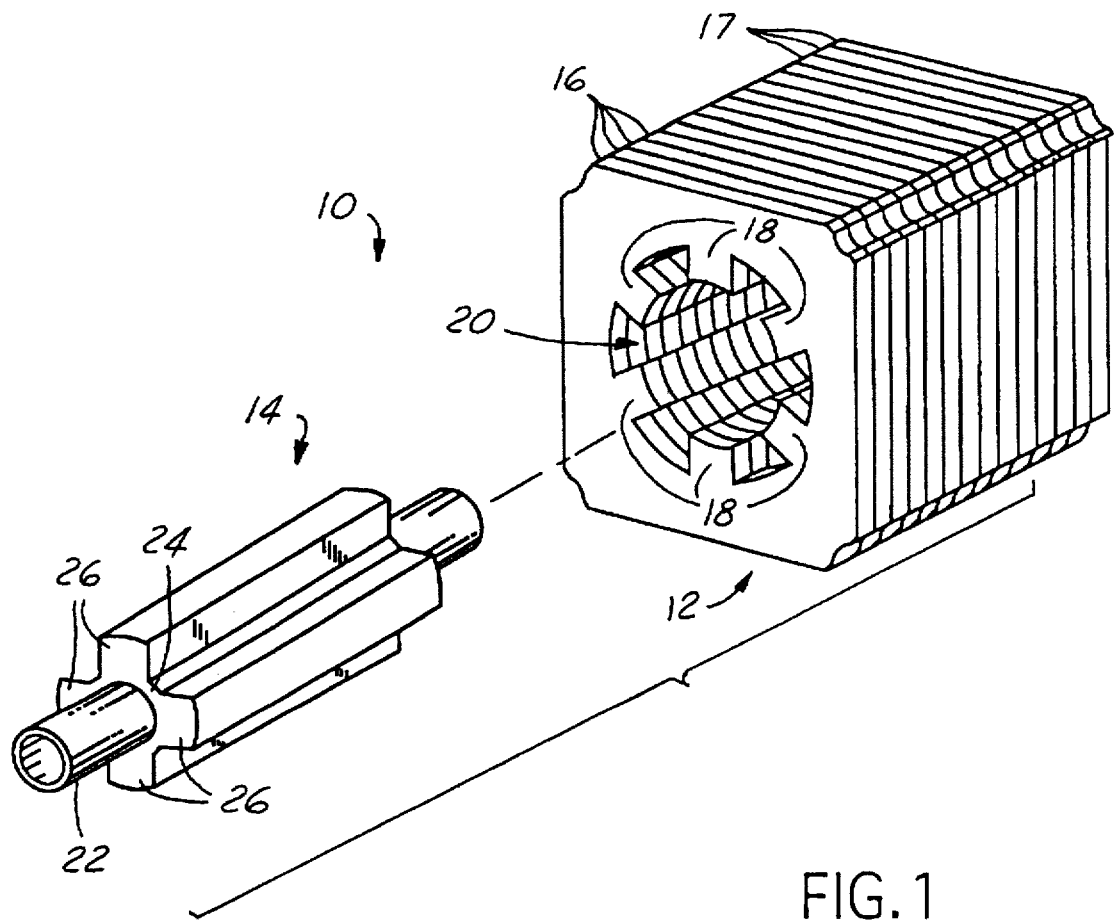
FIG. 1 is an exploded, perspective view of a portion of a switched reluctance electric motor suitable for use in connection with the preferred embodiment of the present invention.

Referring now to the drawings wherein like reference numerals are used to identify identical components in the various views, FIG. 1 shows the major mechanical components of a switched reluctance electric motor 10, which includes a stator assembly 12 and a rotor assembly 14. Although the invention will be described and illustrated in the context of a switched reluctance (SR) electric motor 10, it will be appreciated that this invention may be used in conjunction with other well-known electric motor structures. Stator assembly 12, in a preferred embodiment, comprises a plurality of laminations 16. Laminations 16 are formed using a magnetically permeable material, such as iron. To provide for position sensing, integral encoder laminations 17, having the same structure as laminations 16, may be included in one end of stator assembly 12.

Stator 12 is generally hollow and cylindrical in shape. A plurality of radially, inwardly extending poles 18 are formed on stator 12 (via laminations 16) and extend for a predetermined length of the total length thereof. Poles 18 are preferably provided in diametrically opposed pairs. It should be appreciated, however, that a greater or lesser number of poles 18 may be provided in any particular configuration.

Each of the poles 18 may have a generally rectangular shape, when taken in cross-section. The radially innermost surfaces of the poles 18 are slightly curved so as to define an inner diameter. Encoder poles (shown as 19 in FIG. 2) have a structure corresponding to the structure of poles 18. The similar structure allows encoder poles to emulate poles 18 and to allow the position of rotor 14 to be calculated. Bore 20 is adapted in size to receive rotor assembly 14.

Rotor assembly 14, when assembled into stator 12 (see FIG. 2) is coaxially supported within stator 12 for relative rotational movement by conventional means. For purposes of description only, rotor assembly 14 may be supported by conventional bearings mounted in a conventional housing (not shown) secured to the longitudinal ends of stator assembly 12. Rotor assembly 14 includes a generally cylindrical shaft 22 and rotor 24. Shaft 22 may be solid but is illustrated as hollow. Rotor 24 is secured to shaft 22 for rotation therewith. For example, rotor 24 may be secured to shaft 22 by means of a spline (not shown), or other conventional means well-known in the art. Thus, it should be appreciated that shaft 22 and rotor 24 rotate together as a unit.

Rotor 24 includes the plurality of poles 26 formed on an outer surface thereof. Each pole 26 extends radially outwardly from the outer surface thereof and is formed having a generally rectangular shape, when taken in cross-section. Rotor poles 26 extend longitudinally throughout the entire length of the outer surface of rotor 24. The radially outermost surfaces of rotor poles 26 are curved so as to define an outer diameter, adapted in size to be received within the inner diameter defining bore 20. That is, the outer diameter formed by the poles 26 is slightly smaller than the inner diameter defined by the radially innermost curved surfaces of stator poles 18. Rotor poles 26 are also preferably provided in diametrically opposed pairs. Four rotor poles 26 are provided on the illustrated rotor assembly 14. It should be appreciated that a greater or lesser number of rotor poles 26 may be provided. For SR motors, in general, the number of rotor poles 26 differs from the number of stator poles 18, as is well-known. Rotor 24, including poles 26, may be formed from a magnetically permeable material, such as iron.

Figure 2:
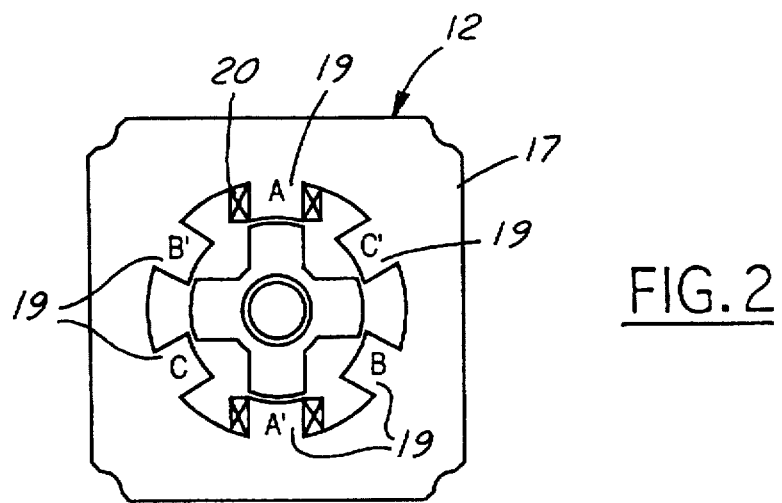
FIG. 2 is a diagrammatic, exaggerated, cross-sectional view of a switched reluctance electric motor illustrating the relative positions of a stator and rotor portions thereof.

Referring now to FIG. 2, a diagrammatic cross-section of a rotor 24 is shown assembled in relation to encoder laminations 17 which drive encoder poles 19. In contrast to the stator windings (the main torque-producing windings which form the several machine phases—not illustrated) that are energized in a conventional sequential manner to cause rotor 24 to rotate, encoder windings 28 are used simultaneously to provide feedback so that an angular position of rotor 24, with respect to stator 12, may be determined. Encoder poles 19 occur in pairs: i.e., AA', BB', and CC' following the configuration of motor 10. Rotor poles 26 also occur in pairs. Only one encoder winding 28 is shown for clarity (e.g., pole A) with its diametrically opposite pole (A). This defines encoder phase A. The SR motor 10 also has encoder phase B and encoder phase C, each defined by a corresponding pole pair and encoder winding 28.

Figure 3:
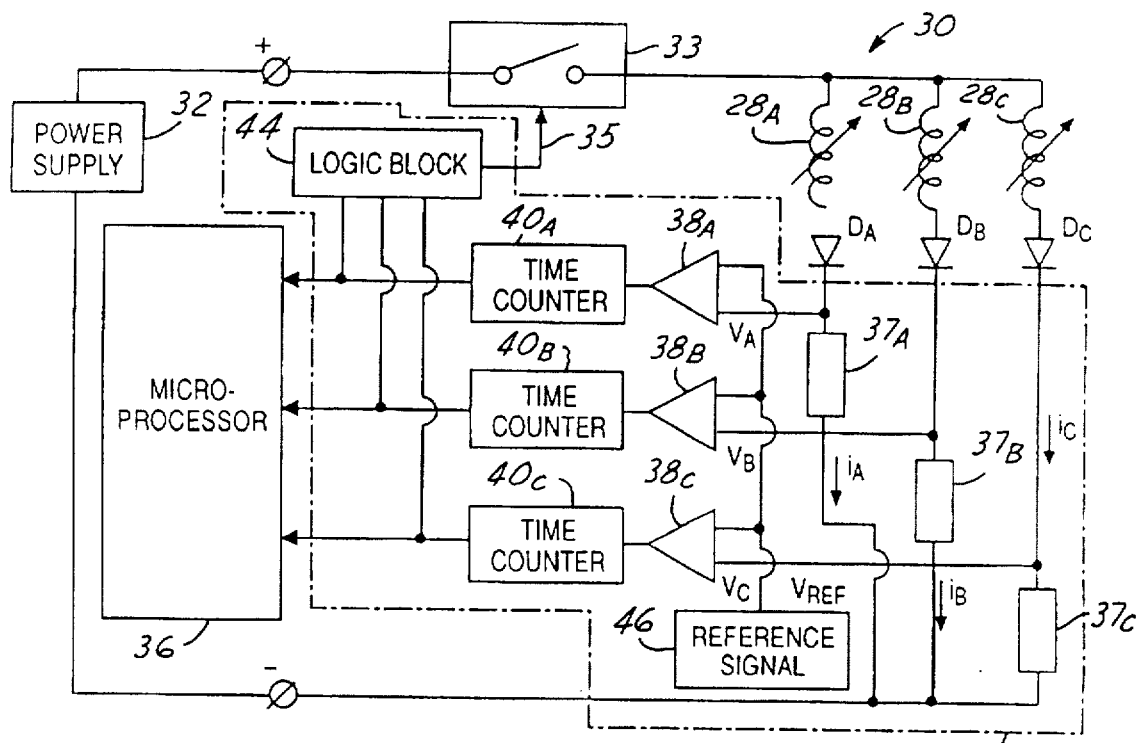
FIG. 3 is a schematic circuit diagram of the encoder circuit of the present invention.

FIG. 3 shows a simplified schematic and block diagram view of a system 30 for determining an angular position of rotor 14 of motor 10. System 30 includes a plurality of encoder windings indicated at $28_A$, $28_B$, and $28_C$ (for a 3-phase motor system 10), a source of electrical power 32 having a positive terminal, and a negative terminal, means, such as a single switch 33, for simultaneously connecting and disconnecting encoder windings $28_A$, $28_B$, and $28_C$ to and from the positive terminal of power supply 32, a corresponding plurality of diodes $D_A$, $D_B$, and $D_C$, means, such as sensing and control circuit 34, for sensing a respective current level through encoders windings $28_A$, $28_B$, and $28_C$, and for generating a deenergization signal to control switch 33 in response thereto, and means, such as microprocessor 36, for calculating an angular position of rotor 14 of motor 10.

Encoder windings $28_A$, $28_B$, and $28_C$ are schematically illustrated as variable inductors, since a respective inductance value associated with each winding will change, as is known in the art, as an angular position of rotor 24 changes. Encoder windings $28_A$, $28_B$, and $28_C$ may be disposed in operative proximity with respect to rotor assembly 14 in order to effect the inductance profile emulation of the main, torque-producing phase windings referred to herein. Preferably, there is one encoder winding for each phase of motor 10, which may comprise the windings 28 respectively formed around opposing encoder poles and connected in-series, as is known in the art for constructing the corresponding torque-producing phase windings.

Diodes $D_A$, $D_B$ and $D_C$ are provided to prevent reverse current flow through the encoder windings $28_A$, $28_B$, and $28_C$, especially when switch 33 disconnects power source 32 from the encoder windings.

Power supply 32 is conventional, and well-known in the art. In particular, power supply 32 is provided to supply current at pre-selected voltage potentials in order to develop the respective currents through encoder coils $28_A$, $28_B$, and $28_C$, at necessary levels.

Switch 33, as indicated above, is coupled between power supply 32, and a first terminal of each one of the plurality of encoder windings $28_A$, $28_B$, and $28_C$. The switch is controlled by an energization signal (to be described in further detail hereinafter) for connecting the several encoder windings $28_i$ to power supply 32 to initiate a respective current $i_A$, $i_B$, and $i_C$ therethrough. Switch 33 is further responsive to a deenergization signal (also to be described in further detail hereinafter), for simultaneously disconnecting the plurality of encoder windings $28_i$ from power supply 32 to simultaneously interrupt the currents in all of the encoder windings. Switch 33 may comprise a solid state semiconductor switch, such as a power transistor. In a preferred embodiment, switch 33 may be a power MOSFET device. Alternatively, switch 33 may also comprise a variety of well-known switching devices, such as a thyristor the like. In an alternate embodiment (not shown), switch 33 may comprise a plurality of switching devices simultaneously controlled to effect the above-referred-to simultaneous connection/disconnection of encoder windings $28_i$ with power supply 32.

Sensing and control circuit 34 is responsive to the encoder winding currents $i_A$, $i_B$, and $i_C$ for sensing a respective level of these currents through the encoder windings, and for generating in response thereto a corresponding plurality of current level signals $V_A$, $V_B$, and $V_C$, which all correspond to the angular position of rotor 14. Circuit 34 is further provided for generating the energization, and deenergization signals mentioned above, indicated as a single, composite energization/deenergization signal 35 (i.e., a signal having a first state corresponding to the energization signal, and a second signal corresponding to the deenergization signal). In particular, circuit 34 is operative to generate the deenergization signal in an active state, for disconnecting the plurality of encoder windings $28_A$, $28_B$, and $28_C$, from power supply 32 to simultaneously interrupt the encoder winding currents when all of the current levels $i_A$, $i_B$, and $i_C$ reach a preselected base reference current level $I_R$. Circuit 34 is further operative to generate an energization signal 35 in an active state (after at least one initial energization, and deenergization cycle) after each one of the encoder winding currents has fallen to a preselected minimum current level to thereby connect the encoder windings $28_i$ to power supply 32. This minimum current level may be a substantially zero current level.

Circuit 34 includes means, such as a corresponding plurality of current sensors $37_A$, $37_B$, and $37_C$, for generating the plurality of current level signals $V_A$, $V_B$, and $V_C$, means, such as a plurality of comparators $38_A$, $38_B$, and $38_C$, for comparing, respectively, the current level signals, with a reference current level signal $V_{REF}$, corresponding to the base reference current level, means, such as a plurality of time counters $40_A$, $40_B$, and $40_C$, for measuring respective time intervals, and means, such as logic block 44, for generating the energization, and deenergization signal 35.

Current sensors $37_A$, $37_B$, and $37_C$ are, in a preferred embodiment, resistive elements; however, it should be understood that other electrical components, selected using no more than the skill of one of ordinary skill in the art may be substituted therefor and remain within the spirit and scope of the present invention. The resistive elements forming current sensors $37_i$, are conventional, and well-known in the art.

Each comparator $38_A$, $38_B$, and $38_C$ is associated with a corresponding one of the encoder windings $28_A$, $28_B$, and $28_C$ for monitoring the associated current level therethrough. In particular, each comparator $38_A$, $38_B$, and $38_C$ has respective first and second input terminals, and respective first output terminals. A respective one of the first input terminals of the comparators $38_i$ receives the reference signal $V_{REF}$ from reference signal generator 46, which signal corresponds to the base reference current level. A respective one of the second input terminals of comparators $38_i$ is connected to receive a corresponding one of the encoder winding current level signals $V_A$, $V_B$, and $V_C$. The output terminals of comparators $38_A$, $38_B$, and $38_C$ are provided for generating corresponding output signals wherein each output signal has two states. A first state, which in the preferred embodiment is a logic low level, is generated when the reference signal $V_{REF}$ is greater than the corresponding one of the encoder winding current level signals $V_A$, $V_B$, and $V_C$, indicating that the respective current level is less than the base reference current level. The second state, which may be a logic high state in the preferred embodiment, is generated when a respective one of the current level signals $V_A$, $V_B$, and $V_C$ exceeds the reference current signal $V_{REF}$, indicating that the corresponding current level through the encoder winding exceeds the base reference current level. Comparators $38_i$ are conventional, and well-known in the art.

Time counters $40_A$, $40_B$, and $40_C$ measure respective time intervals required for each of the encoder winding currents $i_A$, $i_B$, and $i_C$ to rise to the base reference current level. In the preferred embodiment, time counters $40_A$, $40_B$, and $40_C$ are connected to respective output terminals of comparators $38_A$, $38_B$, and $38_C$. In particular, in the preferred embodiment, closure of switch 33 initiates each counter $40_A$, $40_B$, and $40_C$. While a respective output of comparators $38_i$ is in the first state (i.e., a logic low state), the corresponding counter will count according to an oscillator (not shown), or other clock generator. When an output signal of a respective one of comparators $38_A$, $38_B$, and $38_C$ transitions to the second state (i.e., a logic high state), indicating that a respective encoder winding current level has exceeded the reference current level, the counting is interrupted, and the count, which corresponds to a time interval, is output on an output terminal thereof. Thus, the time counters $40_A$, $40_B$, and $40_C$ generate time interval signals corresponding to the time interval required for an encoder winding current level to respectively reach the base reference current level. These time interval signals may be either a digital, or an analog representation of the time measured. Moreover, it should be appreciated by one of ordinary skill in the art that these signals are inductance indicative signals corresponding to the then-existing inductance level of a respective one of encoder windings $28_i$, which, as should also be understood, is a function of an angular position of rotor 14.

Logic block 44 controls switch 33. Logic block 44 may comprise discrete logic circuits used to receive the outputs of time counters $40_i$. When all comparators $38_i$ changes state (i.e., when the current level in each encoder winding exceeds the referenced current level), logic block 44 generates the deenergization signal 35 to thereby open switch 33. Logic block 44 may also control generation of the energization signal 35, which may be used to close switch 33 during startup of the operation of motor 10, and/or after operation has started when the current levels $i_A$, $i_B$, and $i_C$ in encoder windings $28_i$ have dissipated their energy through losses in the windings themselves. This function may also be controlled, as should be appreciated by one of ordinary skill in the art, using the outputs of comparators $38_A$, $38_B$, and $38_C$, and microprocessor 36 appropriately programmed to perform steps in response to the monitoring of the output states of comparators $38_i$. That is to say, as illustrated in FIG. 3, counters $40_A$, $40_B$, and $40_C$ and logic block 44 are shown as discrete blocks, but it should be appreciated that microprocessor 36 may be configured to include the above-described functions of time counters $40_i$, and logic block 44.

Microprocessor 36 is responsive to the inductance indicative signals comprising the plurality of time interval signals for calculating the angular position of rotor 14. That is, microprocessor 42 is configured with predetermined inductance-angular position data stored therein, and responds to the respective time intervals that each encoder takes to reach the base reference current level. In particular, as discussed above, it should be understood that the inductance levels of the encoder windings change with respect to the changing angular position of the motor rotor (i.e., as a rotor pole approaches a stator pole). The inductance profile, as described in the Background, has an increasing interval, a subsequent, fairly flat second interval, and a third, decreasing inductance level interval (which occurs as the rotor pole moves away from the stator pole). It is known that the voltage across an inductive element (e.g., an encoder winding) is proportional to the product of its inductance, and the time rate-of-change of the current therethrough. The inductance, as just described, varies as a function of angular rotor position ($_{fATA}$). Thus, if the measured current level, the time interval needed to reach that current level, and the voltage potential that is energizing the encoder winding are all available, an inductance level may be determined, which can then be used to determine the position of the rotor. The angular position of the rotor, once determined, may be profitably employed in commutation of the main, torque-producing phase windings of the motor to, for example, produce a desired output torque profile.

Figure 4:
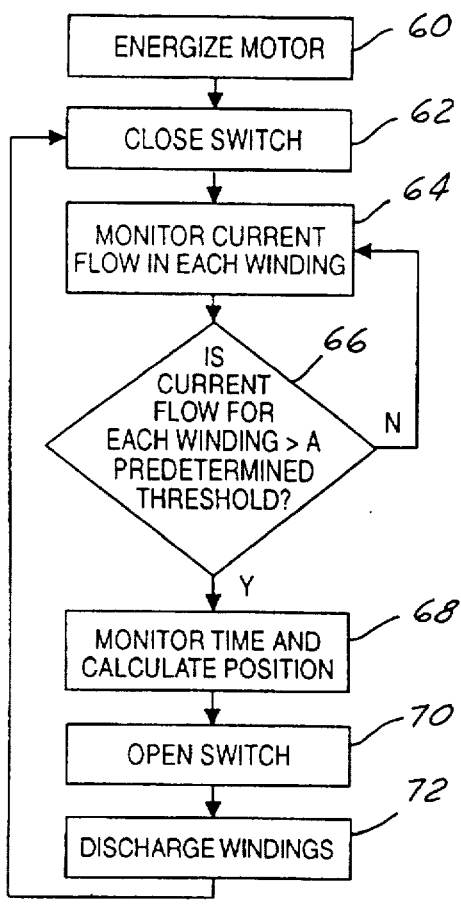
FIG. 4 is a generalized flow chart diagram view of the method steps of the three encoder windings of a preferred embodiment of the present invention.

Referring now to FIG. 4, the operation of circuit 30 will now be set forth in detail. In step 60 motor 10 is energized in a conventional fashion by energizing the main torque producing phase windings in a predetermined manner. Preferably, at the same time, switch 33 closes in step 62 to energize encoder windings $28_A$, $28_B$, and $28c$.

In step 64, the current $i_A$, $i_B$, and $i_C$ in each encoder windings ($28_A$, $28_B$, and $28_C$) is monitored using circuit 34. In particular, in step 66, comparators 38 provide a respective output signal indicative of whether the encoder winding currents have exceeded the reference current level. In the preferred embodiment, the output of a respective one of the comparators is low when the current level in a respective encoder winding is below the reference current level. When the respective current level exceeds the reference current level, the output changes from low to high.

In step 68, the time from the closing of switch 33 to the time a first one of said encoder windings reaches the reference current-level is captured by a corresponding time counter 40. Microprocessor 36 then calculates the position of rotor 14 and determines, using this information, when to turn on and off the phase windings (torque producing) to efficiently operate the motor 10.

Figure 5A:
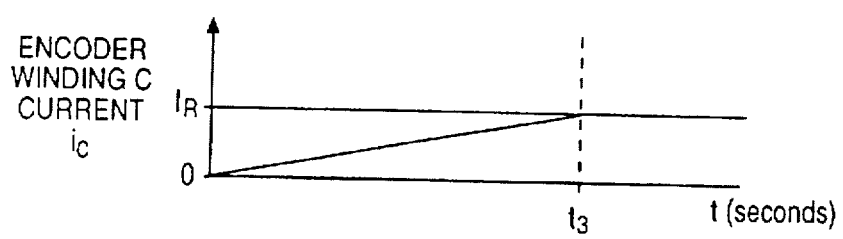
FIGS. 5A-5C are timing diagrams of the respective current level in each of the three encoder windings of a preferred embodiment of the present invention.
Figure 5B:
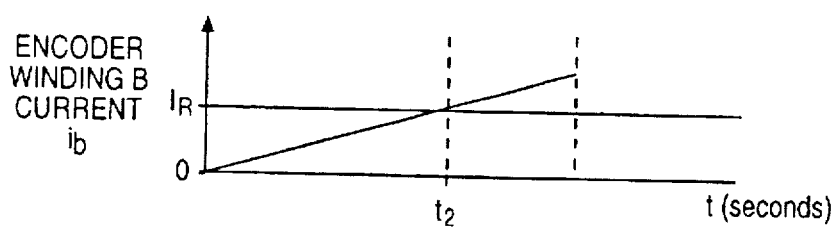
Figure 5C:
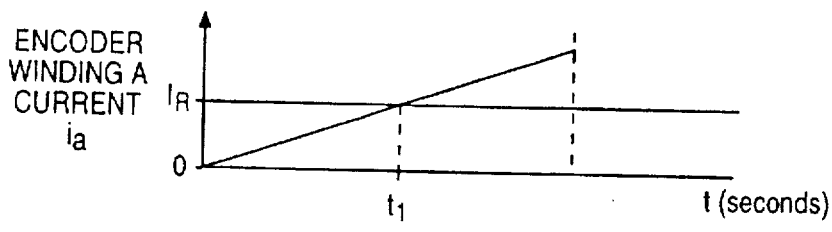

When all of the encoder windings have reached the pre-determined base reference current level, logic block 44 controls switch 33 in step 70. When switch 33 is opened, the energy in the encoder windings is discharged in step 72. The process is then returned to step 62. Switch 33 opens only after each one of the encoder windings reaches at least the predetermined base reference current. Because the moving rotor 14 causes the inductance L($_g$) associated with each encoder winding $28_i$, to vary with time, the resulting current level observed in each encoder winding $28_i$, at any particular time, also varies. The present invention allows the current in any one encoder winding to exceed the base reference current level until all of the currents in the encoder windings reach at least the base reference current level. Since the currents involved in the encoder circuit 30 are relatively small, no damage to the windings occurs when exceeding the base reference current level. Also, since an insignificant amount of torque is generated by the encoder windings 28, no altering of the torque profile is occasioned due to the current in the encoder windings $28_i$;

Referring now to FIGS. 5A–5C, the currents in each encoder winding are shown. The highest inductance encoder winding is shown in FIG. 5A. A middle level inductance encoder winding is shown in FIG. 5B. A low level inductance encoder winding is shown in FIG. 5C. The current in the low level inductance encodes winding exceeds the reference current $I_R$ at an earlier time $T_1$ than in the other encoder windings. In FIG. 5B, the inductance is higher than that of FIG. 5C so that current reaches the reference current level $I_R$ at a later time $T_2$. In FIG. 5A, the inductance is the highest of the encoder windings and thus reaches the reference current level $I_R$ at the latest time $T_3$. At the time $T_3$ the encoder winding in FIG. 5A reaches reference current $I_R$, switch 33 is opened. The time intervals $T_1$, $T_2$, and $T_3$ are used by microprocessor 36 to calculate the angular position of rotor 14.

While the best mode for carrying out the present invention has been described in detail, those familiar with the art to which this invention relates, will recognize various alternative designs and embodiments for practicing the invention as defined by the following claims. For example, a switch for each encoder winding may be implemented using a common control line to ensure common switching.

What is claimed is:

1. An encoder circuit for encoding an angular position of a motor rotor wherein said motor further includes a stator having a plurality of poles, said circuit comprising:

a plurality of encoder windings disposed proximate said stator poles;

a switch coupled between a source of electrical power and each one of said plurality of encoder windings for connecting said encoder windings to said source to initiate a respective current therethrough; and a sensing and control circuit responsive to said currents through said encoder windings for sensing a respective level of said currents through said encoder windings and generating in response thereto a plurality of current level signals corresponding to said angular position, said sensing and control circuit generating a deenergization signal when all of said current levels reach a reference current level, wherein said switch is responsive to said deenergization signal for disconnecting said plurality of encoder windings from said source to simultaneously interrupt said currents in each one of said plurality of encoder windings.

2. The encoder circuit of claim 1 wherein n is the number of said plurality of encoder windings, said circuit further including n-I switches arranged such that each one of said plurality of switches controls said current through a respective one of said plurality of encoder windings, and wherein said sensing and control circuit controls said plurality of switches together to simultaneously disconnect said plurality of encoder windings from said source to thereby effect said simultaneous interruption of current.

3. The encoder circuit of claim 1 wherein said sensing and control circuit is operative to generate an energization signal when each one of said currents through said plurality of encoder windings has fallen to a preselected minimum current level, said switch being further responsive to said energization signal to connect said plurality of encoder windings to said source.

4. The encoder circuit of claim 1 wherein said sensing and control circuit includes plurality of current sensors respectively responsive to the currents through said encoder windings for generating said current level signals.

5. The encoder circuit of claim 4 further including a plurality of comparators respectively responsive to said plurality of current level signals and further respectively responsive to a reference current level signal corresponding to said reference current level, each comparator having a respective output terminal for generating a respective output signal in a first state when a respective one of said plurality of current level signals is less than said reference current level signal, and in a second state when a respective one of said plurality of current level signals exceed said reference current level signal.

6. The encoder circuit of claim 5 wherein said sensing and control circuit includes a timer for measuring respective time intervals for said comparators to transition to said second state after said plurality of encoder windings have been connected to said source wherein said timer generates respective time interval signals corresponding to said time intervals and indicative a said angular position of the rotor.

7. The encoder circuit of claim 6 wherein said sensing and control circuit includes a logic circuit for generating said deenergization signal when each of said comparator outputs have transitioned to said second state.

8. The encoder circuit of claim 7 further comprising a microprocessor responsive to said timer interval signals for calculating said angular position of the rotor.

9. A device for determining an angular position of a rotor of a motor wherein said motor further includes a stator having a plurality of poles, said device comprising:

a plurality of encoder windings disposed proximate said stator poles;

switch means coupled between a source of electrical power and each one of said plurality of encoder windings for connecting said encoder windings to said source to initiate a respective current therethrough; and, sensing and control means coupled to said encoder windings for sensing a respective level of said currents through said encoder windings and generating in response thereto a plurality of inductance indicative signals corresponding to said angular position, said sensing and control circuit generating a deenergization signal when all of said current levels reach a reference current level;

wherein said switch means is responsive to said deenergization signal for simultaneously disconnecting said plurality of encoder windings from said source to simultaneously interrupt said currents in each one of said plurality of encoder windings; and, control means responsive to said inductance indicative signals for calculating said angular position of the rotor.

10. The device of claim 9 wherein said sensing and control means includes current sensing means responsive to the currents through said encoder windings for generating a plurality of current level signals.

11. The device of claim 10 wherein said sensing and control means includes comparison means for comparing said current level signals with a reference current level signal corresponding to said reference current level, said comparison means having an output with a first output state and a second output state, said output changing from a first state to a second state when said current levels reach said reference current level.

12. The device of claim 11 wherein said sensing and control means includes timing means responsive to said comparison means output for measuring respective time intervals corresponding to a respective times between connection of said encoder windings to said source, and said currents reaching said reference current level.

13. The device of claim 12 wherein said sensing and control means includes logic means for generating said energization and said deenergization signals according to said comparison means output.

14. The device of claim 9 wherein said control means includes a microprocessor having predetermined inductance-angular position data stored therein.

15. A method for determining an angular position of a rotor of a motor having a plurality of motor phases associated therewith, said method comprising the steps of:

providing an encoder winding for each phase of said motor;

closing a switch to simultaneously connect each one of the encoder windings to a source of electrical power;

sensing a respective current level in each one of the encoder windings;

opening the switch to simultaneously disconnect each one of the encoder windings from the source when each one of said respective current levels reach a reference current level;

measuring a respective time interval for each one of the respective current levels through the encoder windings to reach the reference current level; and, generating the angular position of the rotor based on the respective time intervals.

16. The method of claim 13 further comprising the step of:

closing the switch after a current subsisting in the encoder windings decays below a preselected minimum current level.

* * * * *

UNITED STATES PATENT AND TRADEMARK OFFICE
CERTIFICATE OF CORRECTION

PATENT NO. : 5,783,940
DATED : July 21, 1998
INVENTOR(S) : Kolomeitsev, Sergei F.

It is certified that error appears in the above-identified patent and that said Letters Patent is hereby corrected as shown below:

Column 8, line 46, please cancel "n-I" and substitute --n-1-- therefor.

Signed and Sealed this

Third Day of November, 1998

*Attest:*

BRUCE LEHMAN

*Attesting Officer*     Commissioner of Patents and Trademarks